United States Patent
Kokx

(10) Patent No.: US 11,884,492 B2
(45) Date of Patent: Jan. 30, 2024

(54) PRODUCT CONTAINMENT GUARD FOR A CONVEYOR

(71) Applicant: Laitram, L.L.C., Harahan, LA (US)

(72) Inventor: David A. Kokx, Hart, MI (US)

(73) Assignee: Laitram, L.L.C., Harahan, LA (US)

( * ) Notice: Subject to any disclaimer, the term of this patent is extended or adjusted under 35 U.S.C. 154(b) by 96 days.

(21) Appl. No.: 17/604,804

(22) PCT Filed: May 4, 2020

(86) PCT No.: PCT/US2020/031315
§ 371 (c)(1),
(2) Date: Oct. 19, 2021

(87) PCT Pub. No.: WO2020/227209
PCT Pub. Date: Nov. 12, 2020

(65) Prior Publication Data
US 2022/0212876 A1    Jul. 7, 2022

Related U.S. Application Data

(60) Provisional application No. 62/843,812, filed on May 6, 2019.

(51) Int. Cl.
  *B65G 21/20* (2006.01)
  *B65G 21/06* (2006.01)

(52) U.S. Cl.
  CPC ......... *B65G 21/2072* (2013.01); *B65G 21/06* (2013.01); *B65G 2207/26* (2013.01)

(58) Field of Classification Search
  CPC .............. B65G 21/2072; B65G 21/06; B65G 2207/26; B65G 15/62; B65G 41/00; B65G 15/00; B65G 41/008; B65G 45/10; B65G 47/22
  USPC ................................ 198/836.1, 836.3, 836.4
  See application file for complete search history.

(56) References Cited

U.S. PATENT DOCUMENTS 3,605,994 A * 9/1971 Parlette .................. B65G 21/06
                                              198/841
3,669,244 A * 6/1972 Pagdin ............... B65G 21/2072
                                              198/570
3,800,938 A * 4/1974 Stone ..................... B65G 21/02
                                              198/836.3

(Continued)

FOREIGN PATENT DOCUMENTS

CH         61400 A    9/1913
JP    11-005610 A    1/1999

(Continued)

OTHER PUBLICATIONS

Extended European Search Report of European Patent Application No. 20802193.1, dated Jan. 9, 2023, European Patent Office, Munich, Germany.

(Continued)

*Primary Examiner* — Mark A Deuble
(74) *Attorney, Agent, or Firm* — Catherine M. Bishop

(57) ABSTRACT

A conveyor employs an adjustable product containment guard adjacent to a carryway for containing product on the carryway. The product containment guard is mounted to an end plate that includes multiple seats for moving the product containment guard between different positions.

15 Claims, 5 Drawing Sheets

(56) References Cited

U.S. PATENT DOCUMENTS

| | | | |
|---|---|---|---|
| 3,825,108 A * | 7/1974 | Stone | B65G 21/06 198/570 |
| 4,225,035 A | 9/1980 | Mohney et al. | |
| 4,511,031 A * | 4/1985 | Lachonius | B65G 21/02 198/860.2 |
| 4,951,809 A * | 8/1990 | Boothe | B65G 21/02 198/841 |
| 4,993,542 A | 2/1991 | Nomura | |
| 5,137,145 A | 8/1992 | Clopton | |
| 6,244,429 B1 | 6/2001 | Drewitz et al. | |
| 7,798,315 B2 * | 9/2010 | Shun | B65G 21/06 198/836.3 |
| 9,828,168 B2 * | 11/2017 | Schmidt-Ellinger | B65D 25/14 |
| 9,828,186 B2 | 11/2017 | Weickert et al. | |
| 10,625,947 B2 | 4/2020 | Hsiao | |
| 10,836,583 B2 | 11/2020 | Layne et al. | |
| 11,001,451 B2 | 5/2021 | Gagne | |
| 2002/0148709 A1 | 10/2002 | Claig et al. | |

FOREIGN PATENT DOCUMENTS

| | | | |
|---|---|---|---|
| KR | 10-0999527 B1 | 12/2010 | |
| WO | WO-2021201751 A1 * | 10/2021 | B65G 21/2072 |

OTHER PUBLICATIONS

Second Office Action, Chinese Invention Patent Application No. 2020800311108, dated Jul. 8, 2023, CNIPA.

* cited by examiner

PRODUCT CONTAINMENT GUARD FOR A CONVEYOR

RELATED APPLICATIONS

The present application claims priority to U.S. Provisional Patent Application No. 62/843,812 filed May 6, 2019 and entitled "Product Containment Guard for a Conveyor," the contents of which are herein incorporated by reference.

FIELD OF THE INVENTION

The present invention relates to power-driven conveyors. More particularly, the invention relates to product containment guards for a conveyor.

BACKGROUND OF THE INVENTION

Power-driven conveyors are used to convey items. A conveyor comprises a frame forming a carryway for a conveyor belt, which travels through a circuit and returns to an infeed through a returnway below a carryway. Product containment rails may be placed along one or more sides of the carryway for containing product on the carryway. Current product containment guards are bolted in place, and not easily removeable, replaceable or cleanable and tend to harbor bacteria, debris, contaminants and other unhygienic material.

SUMMARY OF THE INVENTION

A conveyor comprises a frame forming a carryway for a conveyor belt, infeed and outfeed assemblies, a returnway and one or more movable product containment guards for containing product on the carryway. The product containment guards can be moved between an operational position adjacent the carryway and one or more cleaning positions without the use of tools, and easily integrated into and—or removed from the frame without the use of tools.

According to an embodiment, an assembly for a conveyor comprises a conveyor frame for supporting a conveyor belt, a carryway for the conveyor belt extending in a longitudinal direction and a product containment guard on a side of the carryway. The product containment guard comprises a longitudinal containment rail extending adjacent to a first edge of the carryway for containing product on the carryway, a vertical support rail connected to the longitudinal containment rail, an upper mounting rail extending perpendicular to the vertical support rail in a longitudinal direction and a lower mounting rail below the upper mounting rail and extending in the longitudinal direction.

According to another embodiment, an assembly for a conveyor comprises a conveyor frame for supporting a conveyor belt, a carryway for the conveyor belt and an end plate connected to the conveyor frame for mounting a product containment guard. The end plate comprises a first open recess in a top wall and an elongated slot below the first open recess.

According to another embodiment, a product containment guard for containing product on a conveyor comprises a longitudinal containment rail configured to be placed adjacent to an edge of the conveyor carryway, a vertical support rail connected and extending down relative to the longitudinal containment rail, an upper mounting rail extending in the longitudinal direction from the vertical support rail and having a narrow neck to form a circumferential channel separating an end face of the upper mounting rail from the body of the rail and a lower mounting rail extending below and parallel to the upper mounting rail. The lower mounting rail comprises an obround-shaped end knob.

DETAILED DESCRIPTION OF THE INVENTION

The present invention provides a product containment guard for a conveyor that can be easily moved between an operation position and a cleaning position, and removed and assembled, without tools. The present invention will be described below relative to an illustrative embodiment. Those skilled in the art will appreciate that the present invention may be implemented in a number of different applications and embodiments and is not specifically limited in its application to the particular embodiments depicted herein.

Figure 1:
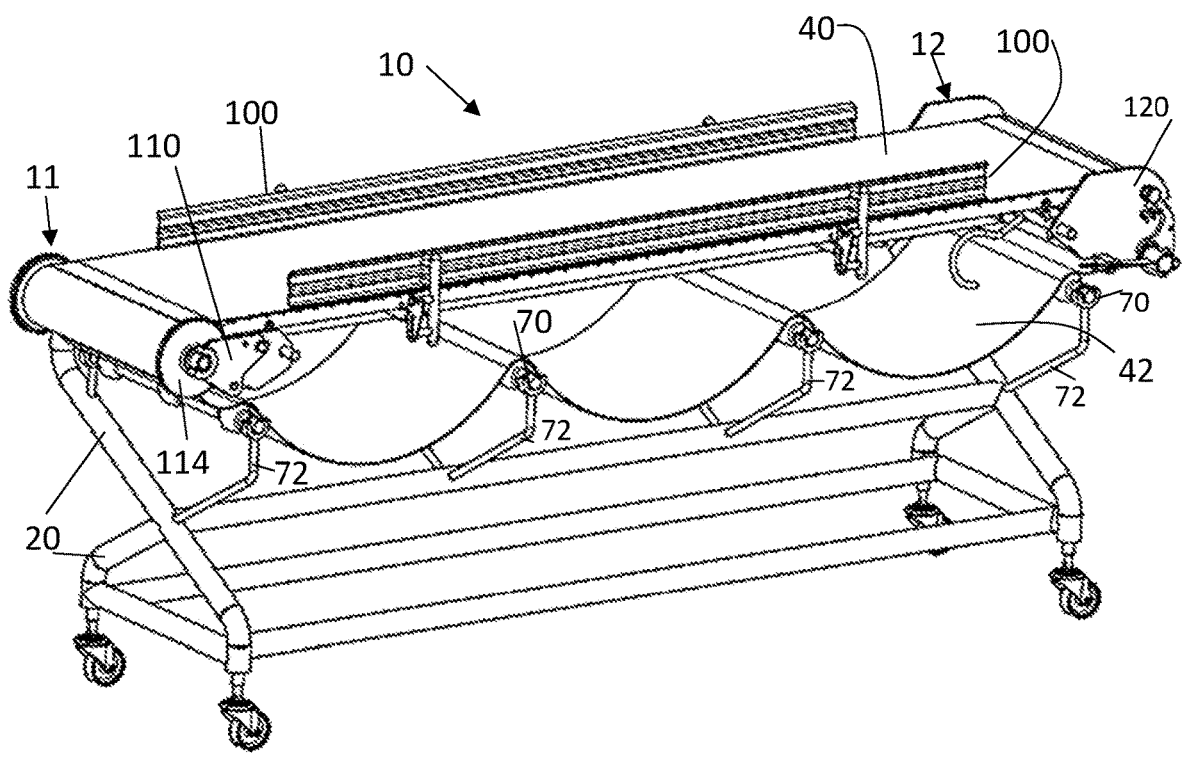
FIG. 1 is an isometric view of a conveyor including product containment guards according to an embodiment of the invention.
Figure 2:
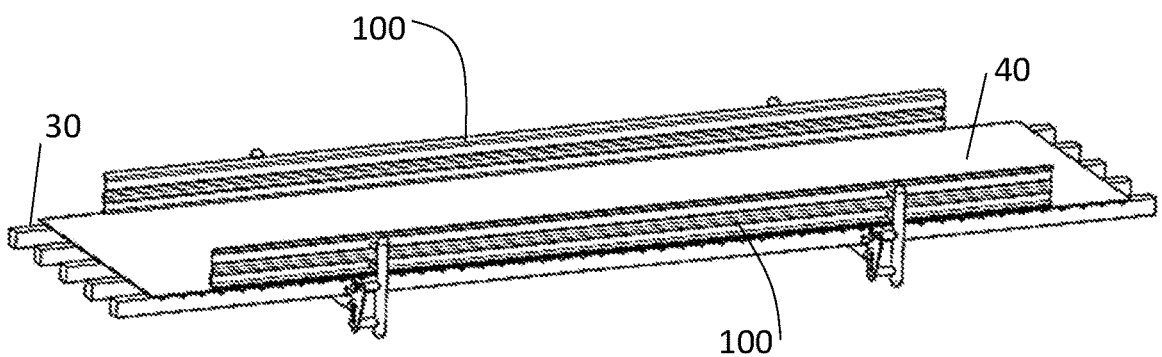
FIG. 2 is an isometric view of the carryway and product containment guards of the conveyor of FIG. 1.

A conveyor frame embodying features of the invention is shown in FIGS. 1 and 2. The exemplary conveyor frame 10 supports a conveyor belt 40 traveling in a longitudinal direction between a first end, the infeed 11, of the frame and a second end, the outfeed 12, of the frame. The conveyor belt conveys products from the first end 11 to the second end 12 along a carryway. The conveyor belt 40 may be trained around reversing elements at each end of the carryway 30 and returned along a returnway 42 below the carryway. While the illustrative embodiment shows a conveyor belt 40 for conveying product, the product containment guard may be used with any suitable conveyor for conveying product, not limited to a conveyor belt.

The illustrative frame 10 comprises a plurality of tubular sections forming support structure 20 for a carryway. A carryway 30 is mounted to the support structure for guiding the conveyor belt from the infeed 11 to the outfeed 12. The illustrative carryway 30 comprises a plurality of low-friction rails extending from the infeed 11 to the outfeed 12, upon which the conveyor belt runs. The infeed 11 comprises opposing mounting plates 110 configured to mount an infeed guide roller 114 and other infeed components if required. The outfeed 12 comprises opposing mounting plates 120 configured to mount a drive for the conveyor belt, or other reversing element, and other outfeed components. Alternatively, the drive may be located in the returnway. The frame also includes returnway rollers 70 mounted to returnway mounts 72 below the carryway 30 to form the returnway.

Product containment guards 100 are mounted to the frame on one or both sides of the carryway to contain product on the carryway 30. The illustrative product containment guards have a secure operational position, multiple cleaning position, and a removal position. The product containment guards 100 can be moved between the different positions without the use of tools.

Figure 3:
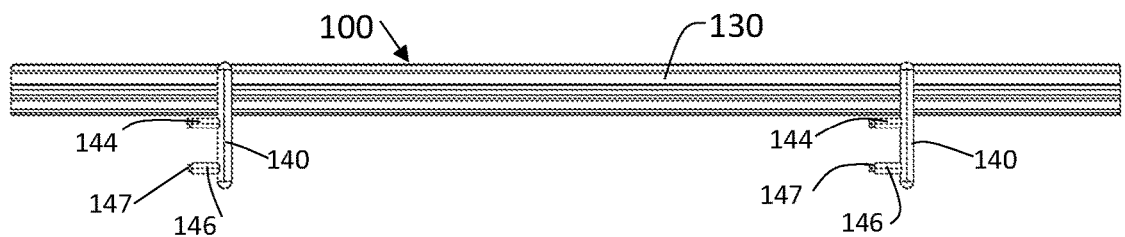
FIG. 3 is a side view of a product containment guard of the conveyor of FIG. 1.
Figure 4:
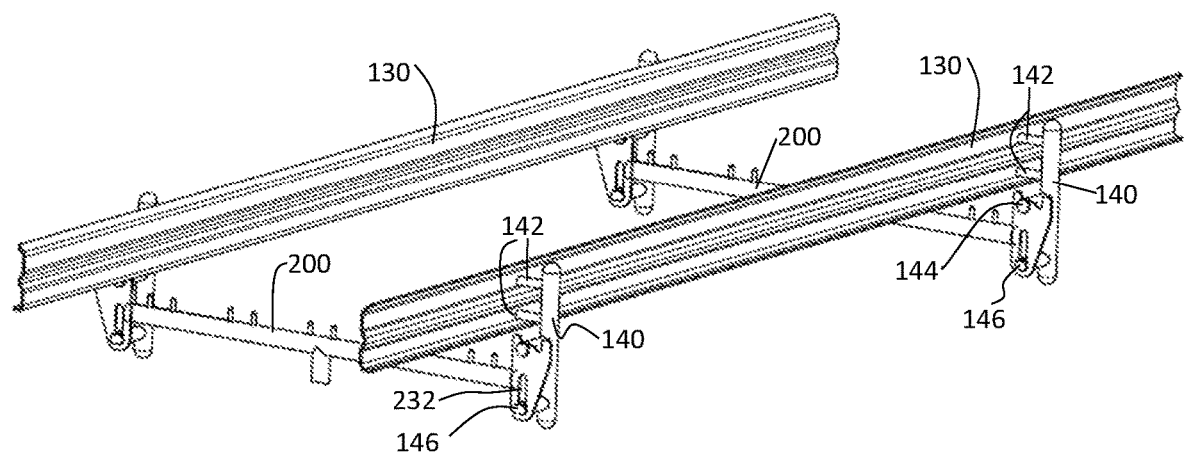
FIG. 4 shows frame mounting components and assembled product containment guards of the conveyor of FIG. 1.
Figure 5:
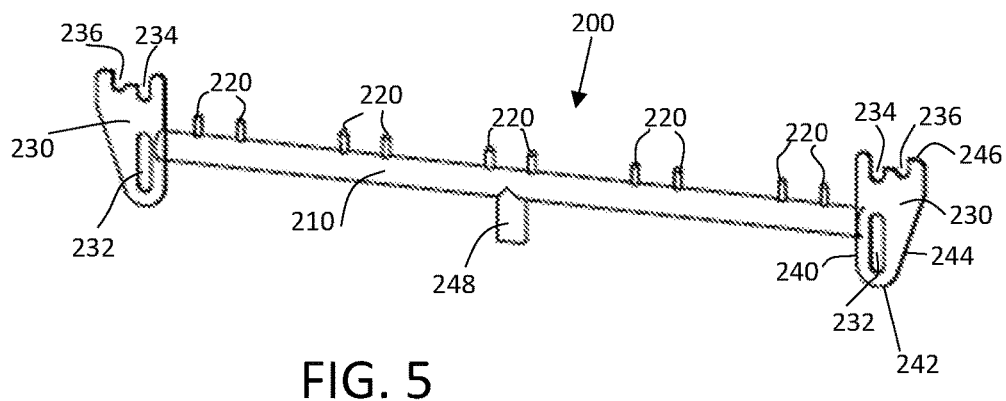
FIG. 5 is an isometric view of a mounting component for mounting a carryway and product containment guards according to an embodiment of the invention.

Referring to FIGS. 3-5, the conveyor frame includes seats for mounting the product containment guards 100 and the carryway 30. Each product containment guard 100 comprises a longitudinal containment rail 130 configured to be placed along a side edge of the carryway for containing product on the conveyor belt. The rail 130 may have any suitable configuration, size, structure and be formed of any suitable material suitable for containing the particular conveyed product. In one embodiment, the conveyor comprises multiple longitudinal containment rails 130 arranged in series along a side of the conveyor carryway, and—or comprise multiple rails arranged vertically. The illustrative longitudinal containment rail 130 comprises bent sheet metal, but the invention is not so limited. The product containment guard 100 further includes at least one, shown as a pair, of vertical support rails 140, each connected to the longitudinal containment rail 130 by a pair of laterally-inward extending protrusions 142, or other suitable connectors. In a middle portion, a first connecting rail 144 extends in the direction of belt travel (longitudinally) from a vertical support rail 140. A lower, second connecting rail 146 extends parallel to the first connecting rail 144 and includes an end knob 147 that has an obround shape, i.e., elongated along one axis and having flat top and bottom surfaces and shorter rounded side surfaces.

The conveyor frame 10 includes one or more mounting components 200, shown in FIGS. 4 and 5 including seats for both the carryway 30 and for the product containment guards 100. Each mounting component 200 comprises a lateral rail 210 mounted to the rails 20 of the frame at selected locations. The mounting component 200 includes seats for the carryway rails. In the illustrative embodiment, pairs of carryway-guiding protrusions 220 extend up from the lateral rail 210 at selected locations for seating a carryway rail. On each side end of the lateral rail 210 extends an end plate 230 for mounting the product containment guard 100. Each end plate 230 comprises a planar body extending laterally from an end of the lateral rail 210, tapering in width W from a top to a bottom. The illustrative end plate 230 includes a vertical inner side wall 240, a rounded bottom end 242, an angled outer side wall 244 and a top wall 246. The end plate body includes a lower vertical slot 232, a first top recess 234 in the top wall 246 and a second top recess 236 disposed laterally outward of the first top recess in the top wall 246. The first top recess 234 is deeper than the second top recess 236. The first and second top recesses 234, 246 have rounded bottoms, but the invention is not so limited. The lower vertical slot 232 has a rounded top and bottom, but the invention is not so limited. A central lower vertical connecting rail 248 connects the mounting component 200 to the rest of the conveyor frame, but other suitable connectors may be used.

FIG. 4 shows an operational position for the product containment guard 100, in which the upper connecting rail 144 is seated in the first top recess 234 close to the edge of the carryway, and the lower connecting rail 146 is seated in the bottom of the vertical slot 232. In this position, the longitudinal containment rail 130 is placed adjacent the side edge of the carryway 30 to contain product conveyed by the conveyor belt 40.

Figure 7:
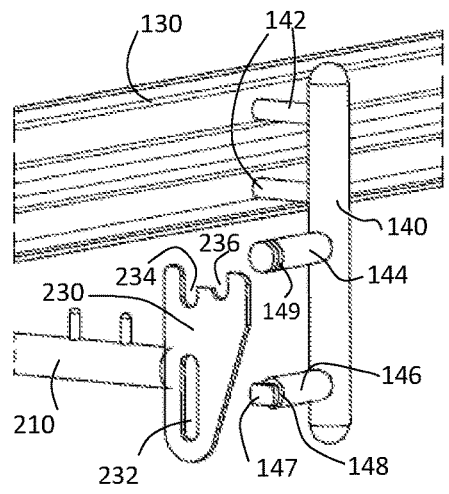
FIG. 7 is a detailed view of the end plate of the mounting component of FIG. 5 and mounting portion of a product containment guard in a separated position.
Figure 8:
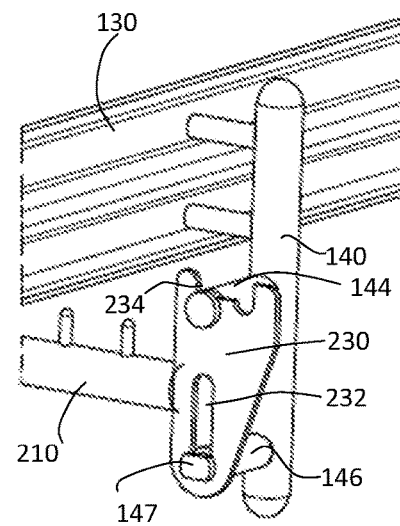
FIG. 8 is a detailed view of the end plate and mounting portion of FIG. 7 in an operational position.
Figure 6:
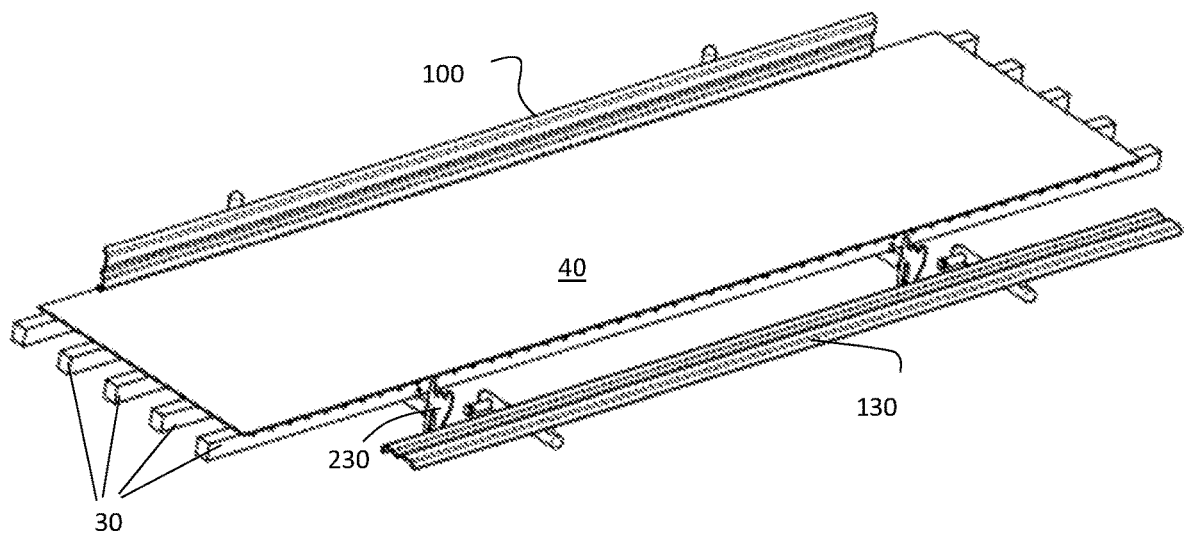
FIG. 6 is an isometric view of the carryway and product containment guards of FIG. 2 in a separated position.

FIGS. 6 and 7 shows the carryway 30, mounting component 200 and product containment guard 100 prior to assembly, in which the mounting rails 144, 146 are separated from the end plate 230. As shown in detail in FIG. 7, the lower connecting rail end knob 147 includes rounded sides and flat top and bottom surfaces. A narrow neck 148 separates the body of the lower protrusion 146 from the end knob 147. The upper mounting rail 144 also includes a narrow neck 149, which forms a circumferential channel in the rail 144 and separates an end face from the body of the rail 144. The illustrative end face of the upper mounting rail 144 is configured to be received in the seats 234, 236. In the illustrative embodiment, the end face of the upper mounting rail 144 is circular, but can have any suitable size, shape and configuration suitable for being received in the seats 234, 236. In the operational position, as shown in detail in FIG. 8, the upper neck 149 is seated and confined by the inner top recess 234 and the lower neck 148 is seated in and confined by the bottom of the vertical slot 232, with the end knob 147, in a position so that it is wider than the vertical lower slot 232, preventing displacement of the lower rail 146. In the operational position, the longitudinal containment rail 130 is substantially vertical and adjacent an edge of the carryway.

Figure 9:
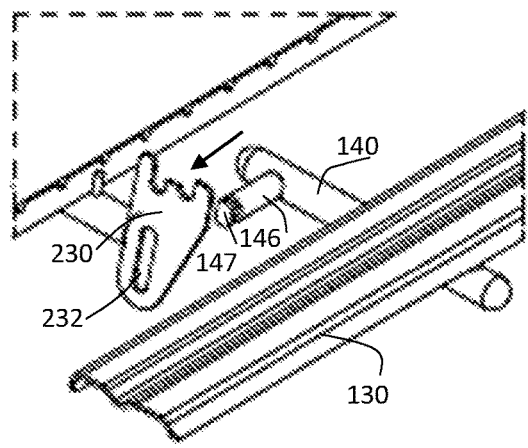
FIG. 9 shows the end plate and product containment guard mounting component of FIGS. 7 and 8 prior to assembly.
Figure 10:
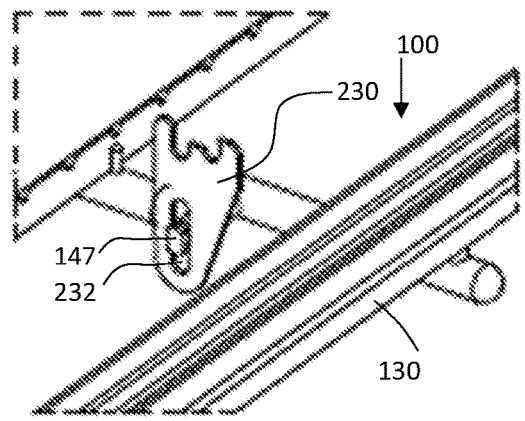
FIG. 10 shows the end plate and product containment guard mounting component of FIGS. 7 and 8 during assembly.
Figure 11:
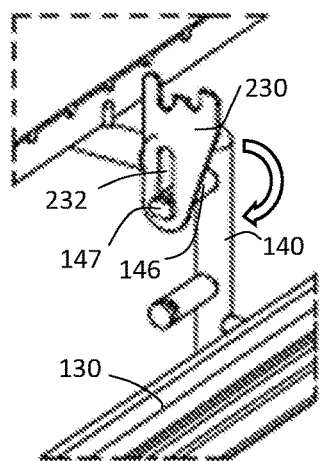
FIG. 11 shows the end plate and product containment guard mounting component of FIGS. 7 and 8 in a first cleaning position.
Figure 12:
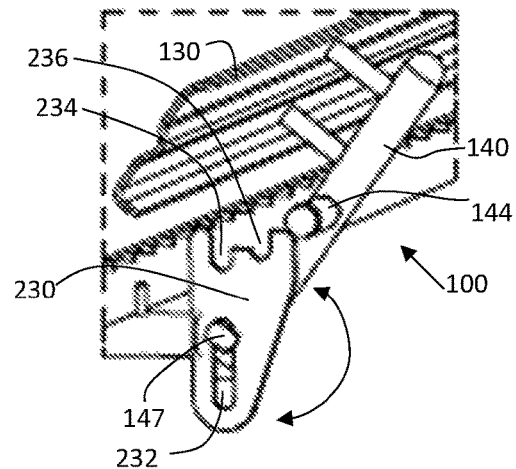
FIG. 12 shows the end plate and product containment guard mounting component of FIGS. 7 and 8 during movement from the first cleaning position to an operational position.
Figure 13:
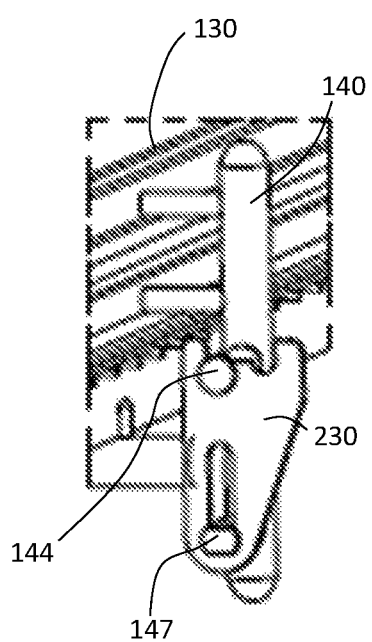
FIG. 13 shows the end plate and product containment guard of FIGS. 7 and 8 in the operational position.

Prior to assembly, as show in FIG. 9, the product containment guard 100 is oriented so that the flat sides of the end knob 147 of the lower rail 146 are aligned with the walls of the vertical slot 232, which is sized to receive the end knob 147 in that orientation. Then, as shown in FIG. 10, the lower rail end knob 147 is inserted in the slot 232 to connect the product containment guard 100 to the end plate 230. As shown in FIG. 11, the product containment guard 100 can rotate down by the force of gravity about the lower rail 146 to a full cleaning position, with the product containment guard 100 contained by the vertical slot 232 via the end knob 147. In this position, the longitudinal containment rail 130 hangs below the carryway, allowing complete access to the carryway edges, without removing the product containment guard 100 from the mounting component. As shown in FIG. 12, the product containment guard 100 can be rotated up about the constrained lower rail 146 towards the seats 234, 236, until the upper rail 144 can be seated in the operational recess 234, as shown in FIG. 13. In this position, as described above, the longitudinal rail containment 130 is disposed adjacent to the carryway of a conveyor and in a substantially vertical position, with the lower slot 232 and recess 234 constraining the product containment guard 100.

Figure 14:
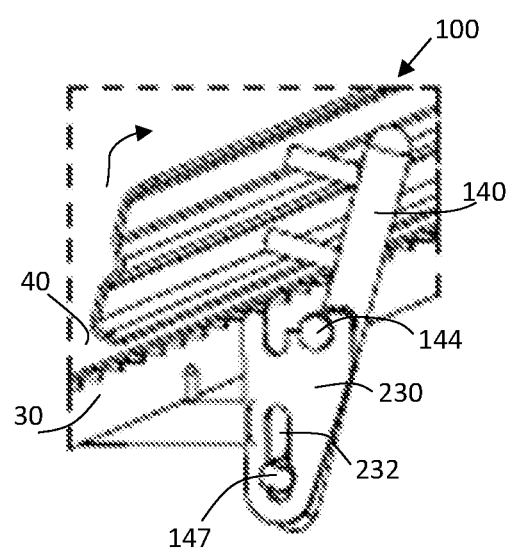
FIG. 14 shows the end plate and product containment guard mounting component of FIGS. 7 and 8 in a second cleaning position.

As shown in FIG. 14, the product containment guard 100 can be rotated out of the operational position to an intermediate position, wherein the upper connecting rail 144 is seated in the second recess 236 of the end plate 230, and the lower connecting rail 146 is rotated within the vertical slot 232, but constrained by the contact between the end knob 147 and vertical slot 232. In this position, the longitudinal containment rail 130 is angled away from the carryway 30. This intermediate position allows access to the edges of the carryway 30 for cleaning or repair of the conveyor belt 40 or for any necessary purpose.

The scope of the claims is not meant to be limited to the details of the described exemplary embodiments.

What is claimed is:

1. An assembly for a conveyor, comprising:
   a conveyor frame for supporting a conveyor belt;
   a carryway for the conveyor belt extending in a longitudinal direction;
   a product containment guard on a side of the carryway, the product containment guard comprising a longitudinal containment rail extending adjacent to a first edge of the carryway for containing product on the carryway, a vertical support rail connected to the longitudinal containment rail, an upper mounting rail extending perpendicular to the vertical support rail in a longitudinal direction and a lower mounting rail below the upper mounting rail and extending in the longitudinal direction; and
   a mounting component for mounting the product containment guard to the conveyor frame, the mounting component comprising
      a lateral rail connected to the conveyor frame; and
      an end plate having an upper surface including a first open recess and a second open recess laterally outward of the first open recess for receiving a narrow neck of the upper mounting rail and a vertical slot below the first open recess for receiving the lower mounting rail.

2. The assembly of claim 1, further comprising laterally inward-extending protrusions extending from the vertical support rail for connecting the vertical support rail to the longitudinal containment rail.

3. The assembly of claim 1, wherein the lateral rail of the mounting component includes a plurality of carryway seats for receiving carryway rails.

4. The assembly of claim 1, wherein the lower mounting rail comprises an end knob having rounded side surfaces and flat top and bottom surfaces to have an obround shape.

5. The assembly of claim 4, wherein the end knob is configured to pass through the vertical slot when orientated in a first position and be constrained by the vertical slot in a second position.

6. The assembly of claim 1, wherein the end plate tapers in lateral width from the upper surface to a rounded bottom end.

7. The assembly of claim 1, wherein the first open recess is deeper than the second open recess.

8. An assembly for a conveyor, comprising:
   a conveyor frame for supporting a conveyor belt;
   a carryway for the conveyor belt;
   an end plate connected to the conveyor frame for mounting a product containment guard, comprising a first open recess in a top wall and an elongated slot below the first open recess; and
   a second open recess in the top wall laterally outward of the first open recess.

9. The assembly of claim 8, wherein the first open recess is deeper than the second open recess.

10. The assembly of claim 8, wherein the end plate tapers in width from the top wall to a rounded bottom end.

11. The assembly of claim 8, wherein the end plate is connected to a lateral rail including a plurality of carryway seats for receiving carryway rails forming the carryway.

12. The assembly of claim 8, further comprising a product containment guard mounted to the end plate, the product containment guard comprising:
   a longitudinal containment rail;
   a vertical support rail connected to the longitudinal containment rail;
   an upper mounting rail extending in the longitudinal direction from the vertical support rail and configured to be received in the first open recess; and
   a lower mounting rail configured to be received in the vertical slot, wherein the lower mounting rail comprises an end knob configured to pass through the vertical slot when in a first orientation and be constrained by the vertical slot in a second orientation.

13. The assembly of claim 12, wherein the end knob has an obround shape.

14. A product containment guard for containing product on a conveyor comprising:
   a longitudinal containment rail configured to be placed adjacent to an edge of the conveyor carryway;
   a vertical support rail connected and extending down relative to the longitudinal containment rail;
   an upper mounting rail extending in the longitudinal direction from the vertical support rail and having a narrow neck to form a circumferential channel separating an end face of the upper mounting rail from the body of the rail; and
   a lower mounting rail extending below and parallel to the upper mounting rail, wherein the lower mounting rail comprises an obround-shaped end knob.

15. The product containment guard of claim 14, further comprising laterally inward-extending protrusions extending from the vertical support rail for connecting the vertical support rail to the longitudinal containment rail.

* * * * *